United States Patent
Bae et al.

(10) Patent No.: US 7,391,754 B2
(45) Date of Patent: Jun. 24, 2008

(54) SYSTEM AND METHOD FOR SEAMLESS HANDOFF OF WLAN-UMTS INTERWORKING

(75) Inventors: Eun-Hui Bae, Seoul (KR); O-Sok Song, Seoul (KR); Sung-Ho Choi, Suwon-si (KR); Dong-Ho Cho, Seoul (KR); Hyun-Ho Choi, Daejeon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 383 days.

(21) Appl. No.: 11/286,329

(22) Filed: Nov. 25, 2005

(65) Prior Publication Data

US 2006/0146803 A1 Jul. 6, 2006

(30) Foreign Application Priority Data

Nov. 26, 2004 (KR) .................. 10-2004-0098232

(51) Int. Cl.
*H04Q 7/00* (2006.01)
*H04Q 7/20* (2006.01)
(52) U.S. Cl. .................. 370/331; 370/338; 370/401; 370/328; 370/329; 455/436; 455/433; 455/435.1; 455/517
(58) Field of Classification Search .............. 370/331, 370/338, 401, 328, 329; 455/436, 433, 435.1, 455/517
See application file for complete search history.

(56) References Cited

U.S. PATENT DOCUMENTS

| 2001/0044305 | A1* | 11/2001 | Reddy et al. ............. 455/436 |
| 2003/0104814 | A1 | 6/2003 | Gwon et al. |
| 2003/0125027 | A1 | 7/2003 | Gwon et al. |
| 2004/0033805 | A1 | 2/2004 | Verma et al. |
| 2005/0002407 | A1* | 1/2005 | Shaheen et al. ........... 370/401 |
| 2006/0003738 | A1* | 1/2006 | Ishikawa ................. 455/411 |

OTHER PUBLICATIONS

El Malki, K Ed., "Low Latency Handoffs in Mobile IPv4," IETF Standard-Working-Draft, Internet Engineering Task Force, IEFT, CH, vol. Mobileip, No. 9; Jun. 2004; XP 015038652 ISSN: 0000-0004, p. 9, Paragraph 3.1-3.8.

* cited by examiner

*Primary Examiner*—George Eng
*Assistant Examiner*—Huy Phan
(74) *Attorney, Agent, or Firm*—Roylance, Abrams, Berdo & Goodman, LLP

(57) ABSTRACT

A seamless handoff system and method reduces delay and packet loss during handoff of user equipment (UE) from a Wireless Local Area Network (WLAN) network to a Universal Mobile Telecommunication System (UMTS) network. The handoff system and method performs pre-registration and pre-authentication processes before the occurrence of a handoff, buffers packets being delivered to a UE during a handoff period, and forwards the buffered packets to the UE after completion of the handoff, thereby reducing packet loss that can occur during handoff.

28 Claims, 4 Drawing Sheets

US 7,391,754 B2

SYSTEM AND METHOD FOR SEAMLESS HANDOFF OF WLAN-UMTS INTERWORKING

PRIORITY

This application claims the benefit under 35 U.S.C. § 119(a) of Korean Patent Application No. 2004-98232, filed Nov. 26, 2004 in the Korean Intellectual Property Office, the entire contents of which are hereby incorporated by reference.

BACKGROUND OF THE INVENTION

1. Field of the Invention

The present invention relates generally to handoff between heterogeneous networks. More particularly, the present invention relates to a handoff method for improving delay and packet loss which may frequently occur when a mobile node (MN) performs handoff from a Wireless Local Area Network (WLAN) network to a Universal Mobile Telecommunication System (UMTS) network.

2. Description of the Related Art

Mobile (Internet Protocol (IP)) Working Group of Internet Engineering Task Force (IETF), an international standardization organization, proposes a pre-registration handoff method as one of the methods capable of supporting a low delay during handoff. The pre-registration handoff method refers to a method in which a Mobile Node (MN) performs L3 (Network Layer) handoff before completion of L2 (Link Layer) handoff with the help of a network. As referenced to herein, the L2 handoff refers to an operation of switching a Foreign Agent (FA) that the MN accesses, and the L3 handoff refers to an operation of registering an IP address of the MN in a Home Agent (HA).

FIG. 1 depicts a signaling diagram illustrating a conventional pre-registration handoff process. Referring to FIG. 1, an MN 110 desires to perform pre-registration handoff from an old FA (oFA) 120 to a new FA (nFA) 130.

Before the pre-registration handoff is performed, the oFA 120 transmits an Agent Solicitation message for requesting information about the nFA 130, step 101. Upon receiving the Agent Solicitation message from the oFA 120, the nFA 130 transmits an Agent Advertisement message including information on the nFA 130 back to the oFA 120, step 102. The MN 110 acquires information on the nFA 130 through the Agent Advertisement message.

Thereafter, if the MN 110 or the oFA 120 receives an L2 trigger, step 107, handoff is triggered (initiated) at the MN 110 or the oFA 120. Specifically, if the MN 110 receives the L2 trigger in step 107, the handoff is triggered by the MN 110. Upon receiving the L2 trigger, the MN 110 transmits a Proxy Agent Solicitation message to the oFA 120 in step 103. Upon receiving the Proxy Agent Solicitation message, the oFA 120 transmits a Proxy Agent Advertisement message to the MN 110 in response thereto, step 104. If the oFA 120 receives the L2 trigger in step 107a, however, the handoff is triggered by the oFA 120. That is, upon receiving the L2 trigger, the oFA 120 transmits a Proxy Agent Advertisement message to the MN 110 in step 104.

Upon receiving the Proxy Agent Advertisement message, the MN 110 transmits a Registration Request message to the nFA 130 via the oFA 120 in step 105 because it is not yet connected to the nFA 130. Upon receiving the Registration Request message, the nFA 130 registers the MN 110 in an HA 140 through a Mobile IP registration process, in step 106, which is the L3 handoff. Thereafter, if the HA 140 delivers a Registration Reply message to the MN 110 via the nFA 130 and the oFA 120 in step 108, the L2 handoff is initiated in step 109. The L2 handoff allows the MN 110 to access the network via the nFA 130 instead of the oFA 120.

The foregoing pre-registration handoff scheme separates the L2 handoff and the L3 handoff, performing first the L3 handoff (that is, the Mobile IP registration process), which may cause a long handoff delay and thereby contribute to a reduction in the total handoff delay.

The pre-registration handoff scheme, which operates based on Mobile IP, is not flexible when applied to a WLAN-UMTS interworking configuration, and must be adapted to perform an actual handoff process in WLAN and UMTS networks, as well as meet the requirements of the networks. That is, during WLAN-UMTS interworking the Mobile IP registration process includes an authentication process, whereas the conventional handoff scheme presents only the mobility-related registration signaling but suggests nothing about the authentication process. This causes a considerable delay and packet loss problem during actual handoff between the WLAN and UMTS networks.

Accordingly, what is needed is a system and method capable of providing fast, seamless handoff during WLAN-UMTS interworking.

SUMMARY OF THE INVENTION

To substantially solve at least the above problems and/or disadvantages, aspects of the present invention provide a system and method capable of providing fast, seamless handoff during WLAN-UMTS interworking.

Another aspect of the present invention provides a system and method for performing pre-registration and pre-authentication processes before occurrence of handoff in order to solve the delay problem occurring during handoff from a WLAN network to a UMTS network.

Another aspect of the present invention provides a system and method for reducing packet loss during handoff, using a scheme that buffers packets being delivered to an MN during a handoff period, then delivering the buffered packet to the MN upon completion of the handoff.

According to an aspect of the present invention, there is provided a method for performing handoff of user equipment (UE) connected to a wireless local area network (WLAN) to a mobile communication network in an interworking system between the WLAN and the mobile communication network including a gateway General Packet Radio Service (GPRS) support node (GGSN) and a serving GPRS support node (SGSN). The method comprises receiving, by the SGSN, a pre-registration request message including a home IP address and an international mobile station identifier (IMSI) of the UE from the UE via the WLAN when the UE determines handoff in response to a link layer trigger while it communicates with the WLAN using a first temporary Internet protocol (IP) address. The method further comprises performing, between the UE and the SGSN, authentication vector generation, authentication for the UE, and encryption key distribution processes based on the IMSI. The method further comprises generating, by the GGSN, a second temporary IP address to be used by the UE in the mobile communication network, and transmitting a first message for requesting registration of the second temporary IP address to a home agent (HA) of the UE. The method further comprises receiving, by the GGSN, a second message indicating registration of the second temporary IP address from the HA of the UE, and transmitting a third message indicating completion of pre-authentication for the UE and registration of the second temporary IP address, to the UE via the WLAN. The method further comprises transmitting, by the UE, a fourth message indicating completion of pre-registration handoff for the UE to the HA of the UE when the handoff of the UE to the mobile communication network is completed.

According to another aspect of the present invention, there is provided a method for performing handoff of user equipment (UE) connected to a wireless local area network (WLAN) to a mobile communication network by a gateway General Packet Radio Service (GPRS) support node (GGSN) in an interworking system between the WLAN and the mobile communication network including the GGSN and a serving GPRS support node (SGSN). The method comprises performing authentication for the UE and encryption key distribution processes between the UE and the SGSN based on an international mobile station identifier (IMSI) of the UE after the UE determines handoff in response to a link layer trigger while it communicates with the WLAN using a first temporary Internet protocol (IP) address, and authentication vector generation. The method further comprises generating, by the UE, a second temporary IP address to be used in the mobile communication network, and transmitting a first message for requesting registration of the second temporary IP address to a home agent (HA) of the UE. The method further comprises transmitting a third message indicating completion of pre-authentication for the UE and registration of the second temporary IP address to the UE via the WLAN upon receiving a second message indicating registration of the second temporary IP address from the HA of the UE so that the UE performs handoff to the mobile communication network.

According to yet another aspect of the present invention, there is provided a mobile communication system comprising user equipment (UE) connected to a wireless local area network (WLAN) through interworking between a mobile communication network and the WLAN. The system further comprises a serving General Packet Radio Service (GPRS) support node (SGSN) for receiving a pre-registration request message including a home IP address and an international mobile station identifier (IMSI) of the UE from the UE via the WLAN when the UE determines handoff in response to a link layer trigger while it communicates with the WLAN using a first temporary Internet protocol (IP) address, and performing authentication vector generation, authentication for the UE, and encryption key distribution processes with the UE based on the IMSI. The system further comprises a gateway GPRS support node (GGSN) for generating a second temporary IP address to be used by the UE in the mobile communication network, transmitting a first message for requesting registration of the second temporary IP address, receiving a second message indicating registration of the second temporary IP address, and transmitting a third message indicating completion of pre-authentication for the UE and registration of the second temporary IP address to the UE via the WLAN The system further comprises a home agent (HA) for registering the second temporary IP address upon receiving the first message from the GGSN, and transmitting the second message to the GGSN in response to the first message. The UE performs handoff to the mobile communication network upon receiving the third message, and transmits a fourth message indicating completion of pre-registration handoff for the UE to the HA.

BRIEF DESCRIPTION OF THE DRAWINGS

The above and other objects, exemplary features and advantages of the present invention will become more apparent from the following detailed description when taken in conjunction with the accompanying drawings, in which.

Throughout the drawings, like reference numbers should be understood to refer to like elements, features, and structures.

DETAILED DESCRIPTION OF EXEMPLARY EMBODIMENTS

The matters exemplified in this description are provided to assist in a comprehensive understanding of certain exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Figure 1:
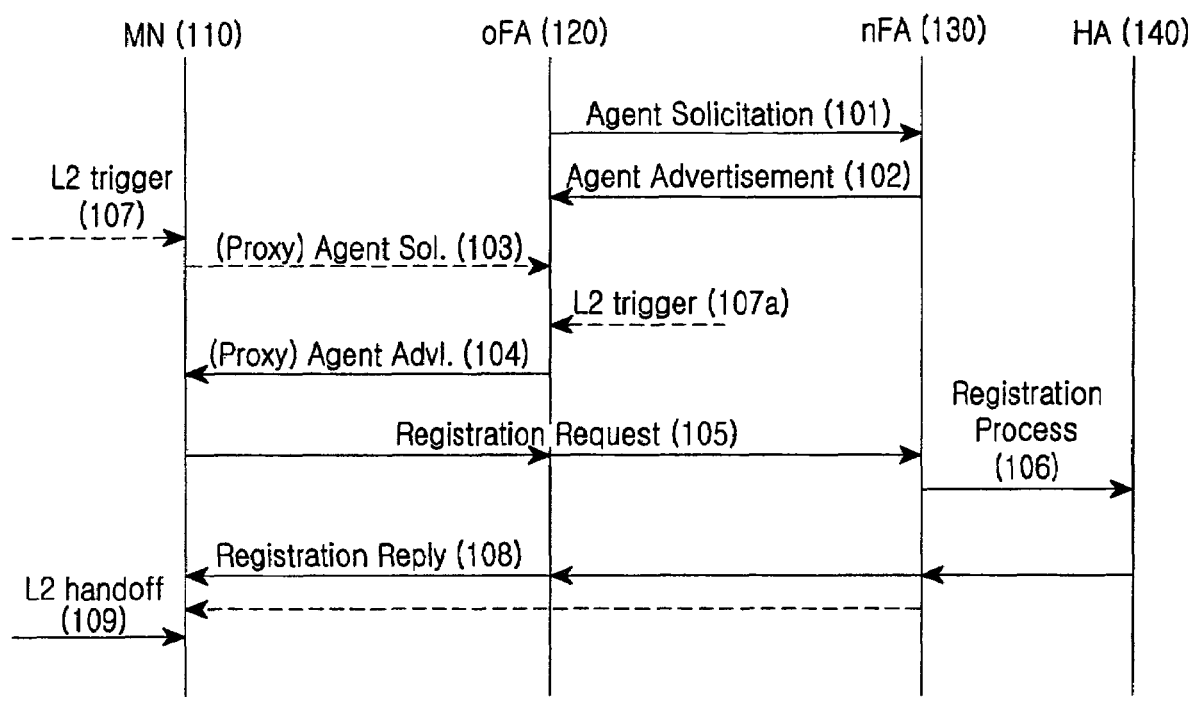
FIG. 1 depicts a signaling diagram illustrating a conventional pre-registration handoff process.
Figure 2:
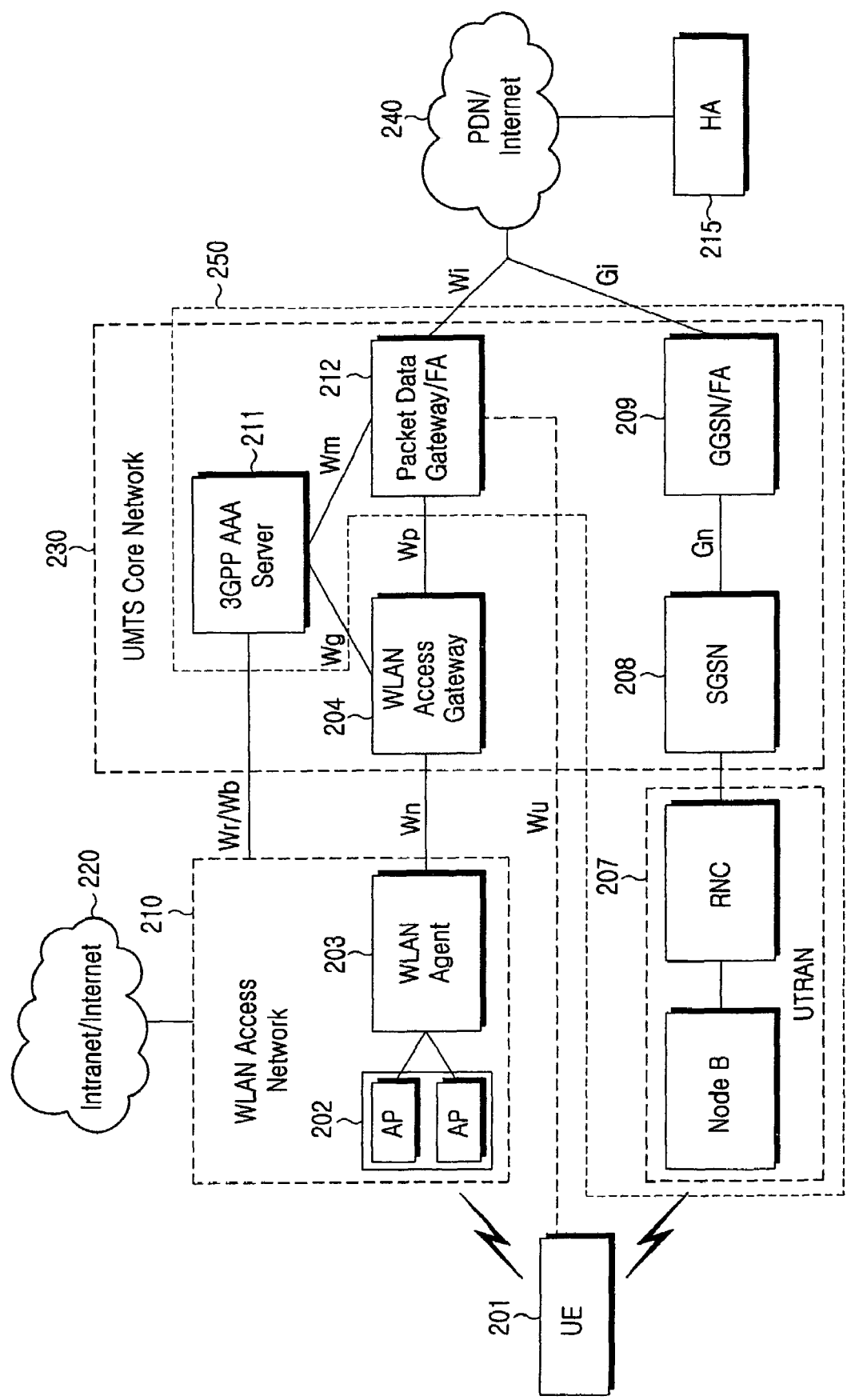
FIG. 2 is a block diagram illustrating a network interworking configuration according to an exemplary embodiment of the present invention.

FIG. 2 is a block diagram illustrating a network interworking configuration according to an exemplary embodiment of the present invention. Referring to FIG. 2, a WLAN Access Network (AN) 210, connected to the Intranet/Internet 220, includes an Access Point (AP) 202 wirelessly connectable to a mobile terminal 201 (hereinafter referred to as a User Equipment (UE) connectable to a UMTS network) and a WLAN agent 203 for managing the AP 202. The WLAN AN 210 is connected to a UMTS core network 230 via a WLAN Access Gateway (WAG) 204.

A UMTS network 250 includes an Ultimate Radio Access Network (UTRAN) 207 wirelessly connectable to the UE 201, a Serving GPRS Support Node (SGSN) 208, a Gateway GPRS Support Node (GGSN)/Foreign Agent (FA) 209, a Packet Data Gateway (PDG)/FA 212 and an Authorization, Authentication and Accounting (AAA) server 211. The UTRAN 207 includes a Node B directly wirelessly connectable to the UE 201, and a Radio Network Controller (RNC) for controlling radio resources of the UE 201.

The PDG/FA 212 has a WLAN-related FA function, and the GGSN/FA 209 has a UMTS-related FA function. A Home Agent (HA) 215 is connected to the FA functions of the PDG/FA 212 and the GGSN/FA 209 via an external Packet Data Network (PDN)/Internet 240.

The UE 201 can communicate with the WLAN AN 210 or the UMTS network 250 via the AP 202 or the UTRAN 207. The UE 201 can communicate with any one of the WLAN AN 210 and the UMTS network 250 at a time.

In an interworking configuration between the WLAN AN 210 and the UMTS network 250, if the UE 201 currently connected to the WLAN AN 210 performs handoff to the UMTS network 250, an exemplary embodiment of the present invention performs UMTS authentication and Packet Data Protocol (PDP) context generation through the WLAN AN 210 before the handoff, thereby enabling seamless handoff. That is, in order to address the handoff delay problem, an exemplary embodiment of the present invention performs authentication and registration processes before completion of L2 handoff, the authentication and registration process being responsible for long handoff delay.

With reference to Table 1 below, a description will now be made of a method for managing an address management table in the HA 215 according to an exemplary embodiment of the present invention.

According to an exemplary embodiment of the present invention, in order to support mobility of the UE 201 during handoff, the HA 215 further manages a 'Next IP address' field for storing the next IP address values in an address management table shown in Table 1, while managing a 'Current IP address' field mapped to a 'Home IP address' field of the UE 201 using Mobile IP. That is, the HA 215 previously registers, in the 'Next IP address' field, an IP address to be allocated from a new FA to which the UE 201 will move.

TABLE 1

| Home IP address | Current IP address | Next IP address |
| --- | --- | --- |
| $IP_{MN1}$ | $IP_{C1}$ | $IP_{N1}$ |
| $IP_{MN2}$ | $IP_{C2}$ | $IP_{N2}$ |
| ... | ... | ... |

Referring to Table 1, the 'Next IP address' field in the address management table is unfilled in the general case; the 'Next IP address' field is filled only when the UE 201 is in a handoff situation. If the 'Next IP address' field has a particular address value, the HA 215 buffers packets being delivered to the UE 201, determining that the UE 201 is in the handoff situation. If pre-registration handoff for the UE 201 is completed, an address value in the 'Next IP address' field is replaced with an address value in the 'Current IP address' field, and the 'Next IP address' field is cleared. The buffered packets are then forwarded to the UE 201 using the address value in the 'Current IP address' field.

For example, if a UE 201 with a Home IP address of '$IP_{MN1}$' generates a handoff request, the HA 215 searches the address management table to read an address value '$IP_{N1}$' in the 'Next IP address' field for the UE 201 with '$IP_{MN1}$'. Thereafter, the HA 215 buffers packets being delivered to an address '$IP_{C1}$' in the 'Current IP address' field, determining that a new IP address that the UE 201 will use after handoff is '$IP_{N1}$'. In other words, HA 215 determines that the 'Next IP address' field is not clear. If the pre-registration handoff for the UE 201 is completed, an address value in the 'Current IP address' field is replaced with an address value '$IP_{N1}$' in the 'Next IP address' field, and the 'Next IP address' field remains 'Null.' The buffered packets are then forwarded to the address '$IP_{N1}$', the handoff target.

A detailed description will now be made of UE 201 IP addresses and signaling messages used when the UE 201 performs handoff from the WLAN AN 210 to the UMTS network 250, according to an exemplary embodiment of the present invention.

The possible IP addresses of the UE 201 include a home IP address '$IP_{UE}$', a temporary IP address '$IP_{UMTS}$' used by the UE 201 in the UMTS network 250 after handoff from the WLAN AN 210 to the UMTS network 250, and a temporary IP address '$IP_{WLAN}$' used by the UE 201 in the WLAN AN 210 before the handoff.

Next, newly added signaling messages will be described in detail.

A Pre-Registration Request message is delivered by a terminal to an FA (new FA) of a new network to which it will move for pre-registration handoff. In an exemplary embodiment of the present invention, the new FA corresponds to the GGSN/FA 209 of the UMTS network 250. Upon receiving the Pre-Registration Request message, the new GGSN/FA 209 delivers an Authentication Request message to the SGSN 208 to request for pre-authentication. The Authentication Request message includes an $IP_{UE}$, and an International Mobile Station Identifier (IMSI) of the UE 201. A Pre-Registration Response message indicates completion of the pre-registration handoff from the new GGSN/FA 209 to the UE 201, and includes an $IP_{UMTS}$.

A Pre-Registration Completion message includes an $IP_{UE}$ or an $IP_{UMTS}$ of the UE 201, and provides the HA 215 with information indicating that the UE 201 has moved to the UMTS network 250 so that the HA 215 may update the 'Current IP address' field corresponding to the $IP_{UE}$ with the $IP_{UMTS}$ in its address management table.

When pre-authentication for the UE 201 is completed, a PDP Address Request message is used by the SGSN 208 to deliver the IMSI of the UE 201 or the $IP_{UE}$ to the GGSN/FA 209 to request for an address value $IP_{UMTS}$ to be used as a temporary address of the UE 201 in the UMTS network 250. A PDP Address Response message is used by the GGSN/FA 209 to deliver a PDP address to the SGSN 208, the PDP address being generated for the UE 201 from which a request for the $IP_{UMTS}$ was received.

A Pre-Registration Update Request message is used by a new GGSN/FA 209 to deliver the $IP_{UE}$ and the $IP_{UMTS}$ to its HA 215 upon receiving the Pre-Registration Response message from the SGSN 208 to request updating the 'Next IP address' field corresponding to the $IP_{UE}$ in the address management table with the $IP_{UMTS}$. Further, a Pre-Registration Update Response message is used by the HA 215 to indicate completion of the update upon receiving the Pre-Registration Response message and is delivered to the GGSN/FA 209.

If the UE 201 currently connected to the WLAN AN 210 moves to the UMTS network 250, the UMTS network 250 has no node capable of serving as the WLAN agent 203. Therefore, the SGSN 208 of the UMTS network 250 substitutes for the WLAN agent 203. That is, the UE 201 performs pre-authentication and pre-registration processes through the SGSN 208, and performs handoff based on information acquired from the SGSN 208 through the processes.

A detailed description will now be made of exemplary pre-authentication and pre-registration processes in which a mobile terminal performs handoff from the WLAN AN 210 to the UMTS network 250.

First Exemplary Embodiment

In a first exemplary embodiment of the present invention, a UE 201 performs a pre-registration handoff process of collectively performing authentication, IP address allocation and registration through a Pre-Registration Request message.

Figure 3:
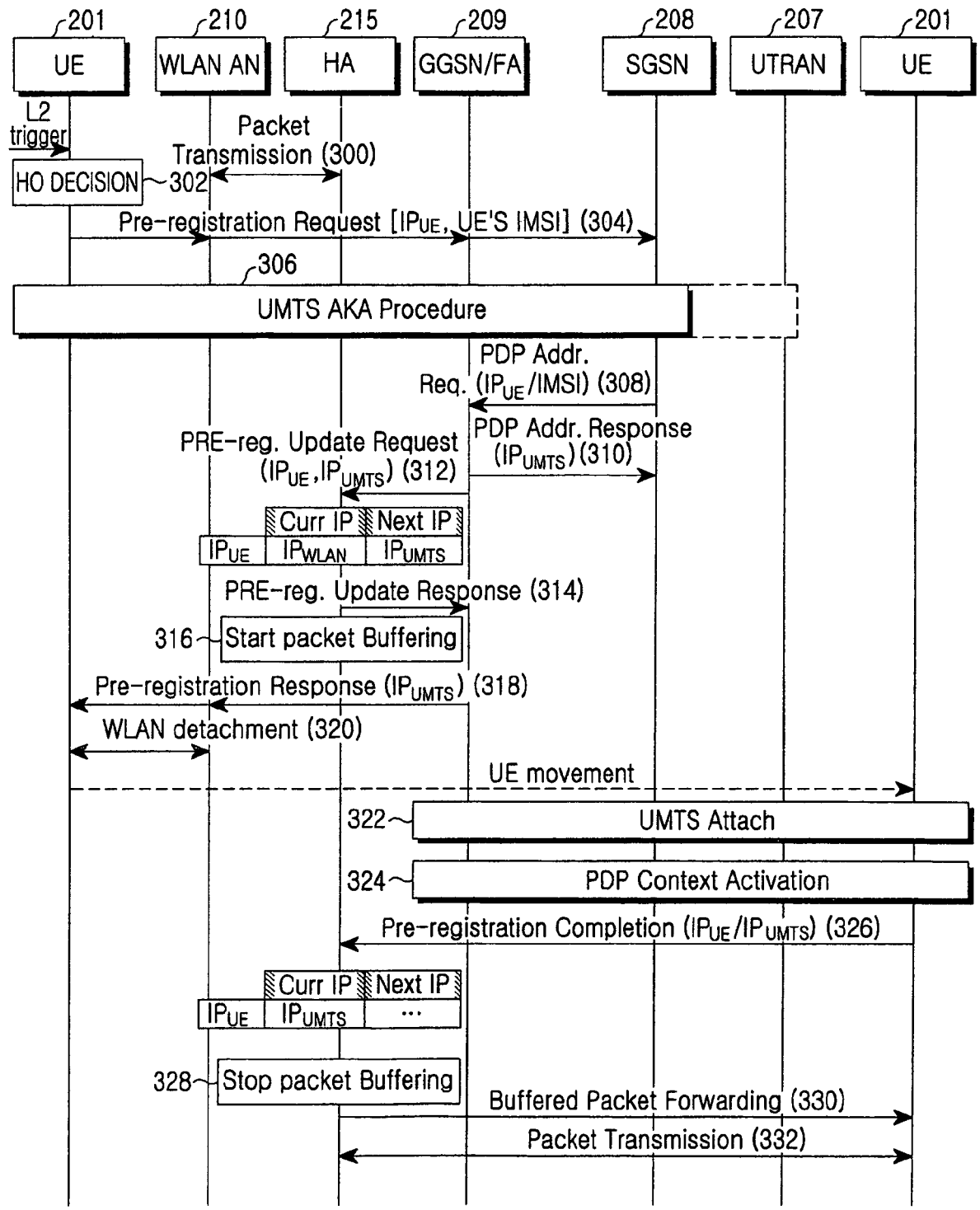
FIG. 3 depicts a signaling diagram illustrating the overall operation in which a UE performs pre-registration handoff from a WLAN network to a UMTS network, according to a first exemplary embodiment of the present invention.

FIG. 3 depicts a signaling diagram illustrating the overall operation in which a UE 201 performs pre-registration handoff from a WLAN AN 210 to a UMTS network 250, according to a first exemplary embodiment of the present invention. Referring to FIG. 3, packet exchange between a WLAN AN 210 and a HA 215 is performed in step 300. If a UE 201 determines that the handoff is in response to an L2 trigger, step 302, the UE 201 delivers a Pre-Registration Request message for requesting pre-authentication and pre-registration to an SGSN 208 via a GGSN/FA 209 of a UMTS network 250 through a WLAN AN 210, step 304. Herein, the Pre-Registration Request message includes such information as an $IP_{UE}$ and an IMSI of the UE 201, and the WLAN AN 210 holds address information of the GGSN/FA 209 that manages cells of the UMTS network 250 to which the UE 201 intends to move.

In step 306, the SGSN 208 performs authentication vector generation, terminal authentication, and encryption key distribution processes through UMTS Authentication and Key Agreement (AKA) based on the IMSI provided from the Pre-Registration Request message. The UMTS AKA process may be classified into two possible processes: one process that does not include a UTRAN 207 and another process that does include the UTRAN 207.

In the UMTS AKA process that does not include the UTRAN 207, the UE 201 does not establish a radio connection before handoff, thus the encryption key values generated after completion of mutual authentication between the UE 201 and the SGSN 208 are not delivered to the UTRAN (that is, the RNC) 207. However, in the UMTS AKA process that does include the UTRAN 207, a radio connection between the SGSN 208 and the UTRAN 207 is established before start of the UMTS AKA process, thus the encryption key values generated after completion of mutual authentication between the UE 201 and the SGSN 208 are delivered to the UTRAN (that is, the RNC) 207.

After completion of the terminal authentication process through the pre-authentication process, the SGSN 208 delivers a PDP Address Request message including an $IP_{UE}$ or an IMSI of the UE 201 to the GGSN/FA 209 to request a PDP address $IP_{UMTS}$ to be used after the handoff, step 308. The process of requesting a new PDP address for the UE 201 is automatically performed by the SGSN 208 after completion of the UMTS AKA process.

Upon receiving the PDP Address Request message, the GGSN/FA 209 generates an $IP_{UMTS}$ for the UE 201 and delivers the $IP_{UMTS}$ to the SGSN 208 using a PDP Address Response message, step 310. The SGSN 208 delivers the PDP Address Response message to the GGSN/FA 209.

In step 312, the GGSN/FA 209 delivers the $IP_{UMTS}$ and the $IP_{UE}$ to the HA 215 using a Pre-Registration Update Request message.

Upon receiving the Pre-Registration Update Request message, the HA 215 updates its address management table by registering the $IP_{UMTS}$ in a 'Next IP address' field for the UE 201, and transmits the update result to the GGSN/FA 209 using a Pre-Registration Update Response message, step 314. That is, a 'Current IP address' field and the 'Next IP address' field for the $IP_{UE}$ in the address management table are set to $IP_{WLAN}$ and $IP_{UMTS}$, respectively. In step 316, the HA 215 buffers packets targeted to a UE 201 with the $IP_{WLAN}$.

Upon receiving the Pre-Registration Update Response message, the GGSN/FA 209 transmits a Pre-Registration Response message to the UE 201 via the WLAN AN 210 to inform the UE 201 of completion of the pre-authentication and pre-registration processes, step 318. The Pre-Registration Response message includes the $IP_{UMTS}$. In step 320, the UE 201 performs detachment from the WLAN AN 210 through an AP 202, and then performs L2 handoff to the UMTS network 250 (UE movement).

After movement to the UMTS network 250, the UE 201 performs a UMTS attachment process in step 322. If encryption key values for the previously established radio connection between the SGSN 208 and the UTRAN 207 are delivered to the UTRAN 207, the AKA process may be completely omitted from the UMTS attachment process. However, when only the authentication vector generation/distribution and mutual authentication between the UE 201 and the SGSN 208 are performed without a previously established radio connection between the SGSN 208 and the UTRAN 207, the AKA process of delivering encryption keys from the SGSN 208 to the UTRAN 207 may be included in the UMTS attachment process.

In step 324, the UE 201 generates, that is activates, a PDP context for data transmission. Because the UE 201 was previously allocated the PDP address $IP_{UMTS}$ through the pre-authentication and pre-registration processes, it uses the intact $IP_{UMTS}$ in the PDP context activation process of step 324.

In step 326, the UE 201 delivers a Pre-Registration Completion message including the $IP_{UE}$ or the $IP_{UMTS}$ to the HA 215. Upon receiving the Pre-Registration Completion message, the HA 215 updates its address management table using the $IP_{UE}$ or the $IP_{UMTS}$. That is, the HA 215 sets the $IP_{UMTS}$ previously registered in the 'Next IP address' field as an address value in the 'Current IP address' field, and performs 'Null' processing on the 'Next IP address' field, thereby completing a Mobile IP registration process. In step 328, the HA 215 stops the packet buffering that has been performed during handoff. In step 330, the HA 215 forwards the buffered packets to the UE 201. In step 332, packets are exchanged between the UE 201, with the $IP_{UMTS}$, and the HA 215.

As described above, according to the first exemplary embodiment of the present invention, the packets generated during handoff of the UE 201 are all buffered in the HA 215, and then transmitted to the UE 201 with the $IP_{UMTS}$ after completion of the handoff of the UE 201, thereby reducing a packet loss in the handoff process.

Second Exemplary Embodiment

In a second exemplary embodiment of the present invention, a UE 201 first performs a pre-authentication process through Pre-Authentication Request/Response messages, then performs a pre-registration process through Pre-Registration Request/Response messages after completion of the pre-authentication process.

Figure 4:
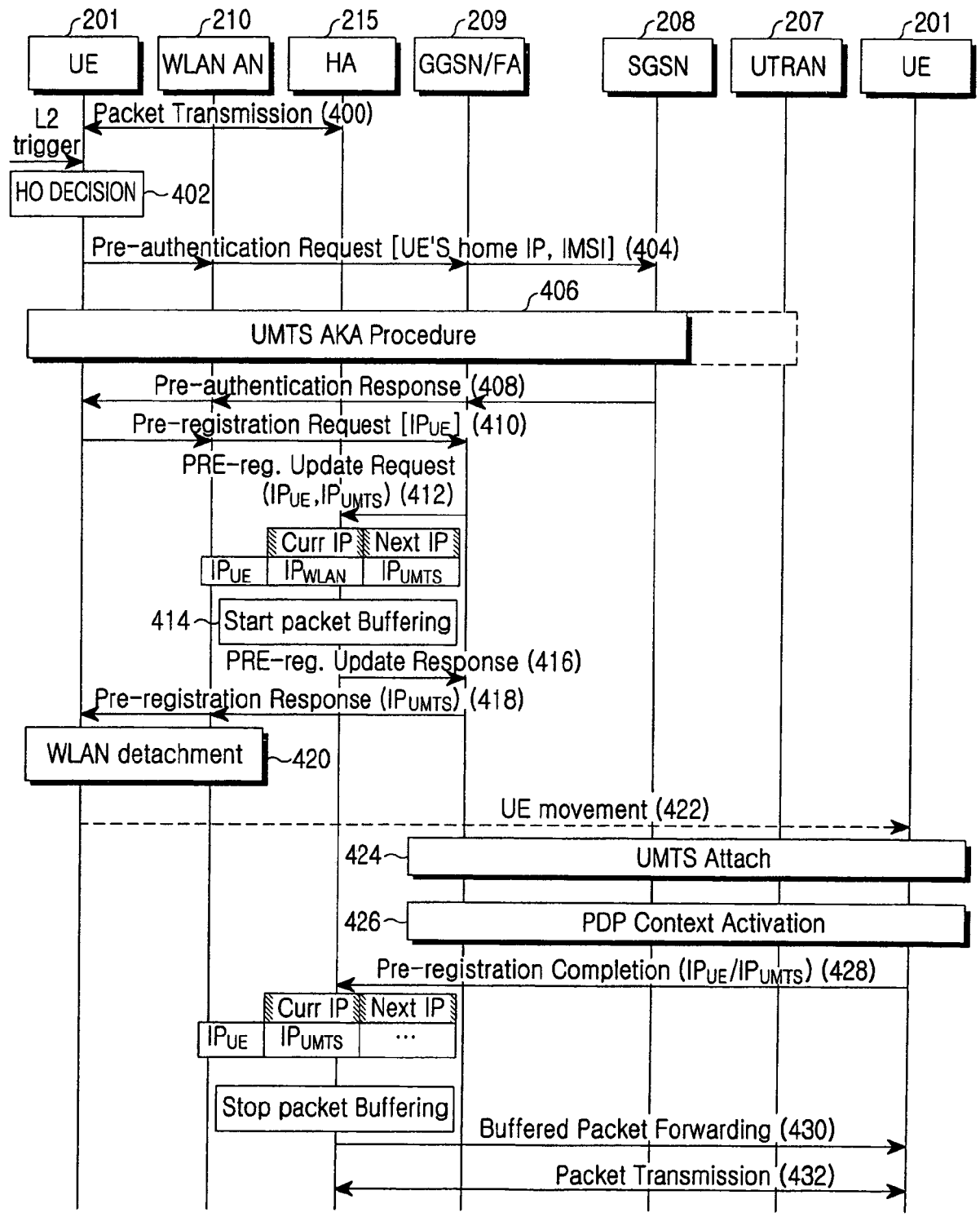
FIG. 4 depicts a signaling diagram illustrating the overall operation in which a UE performs pre-registration handoff from a WLAN network to a UMTS network, according to a second exemplary embodiment of the present invention.

FIG. 4 depicts a signaling diagram illustrating the overall operation in which a UE 201 performs pre-registration handoff from a WLAN AN 210 to a UMTS network 250, according to a second exemplary embodiment of the present invention. Referring to FIG. 4, packet exchange between a UE 201, with an $IP_{WLAN}$ located in a WLAN AN 210, and a HA 215 is performed in step 400. If the UE 201 determines that the handoff is in response to an L2 trigger, step 402, the UE 201 delivers a Pre-Authentication Request message for requesting pre-authentication to an SGSN 208 via the WLAN AN 210 and a GGSN/FA 209, step 409. The Pre-Authentication Request message includes an $IP_{UE}$ and an IMSI of the UE 201, and the WLAN AN 210 holds address information of the GGSN/FA 209 that manages cells of the UMTS network 250 to which the UE 201 intends to move.

In step 406, the SGSN 208 performs authentication vector generation, terminal authentication, and encryption key distribution processes through UMTS AKA based on the IMSI provided from the Pre-Authentication Request message. The UMTS AKA process may be classified into two possible processes: one process that does not include a UTRAN 207 and another process that does include the UTRAN 207.

In the UMTS AKA process that does not include the UTRAN 207, the UE 201 does not establish a radio connection before handoff, thus the encryption key values generated after completion of mutual authentication between the UE 201 and the SGSN 208 are not delivered to the UTRAN (that is, the RNC) 207. However, in the UMTS AKA process that does include the UTRAN 207, a radio connection between the SGSN 208 and the UTRAN 207 is established before start of the UMTS AKA process, thus the encryption key values generated after completion of mutual authentication between the UE 201 and the SGSN 208 are delivered to the UTRAN (that is, the RNC) 207.

After completion of the terminal authentication process for the UE 201 through the pre-authentication process, the SGSN 208 delivers a Pre-Authentication Response message indicating the completion of the pre-authentication process to the UE 201 via the GGSN/FA 209 and the WLAN AN 210, step 408. Unlike the first exemplary embodiment, the second exemplary embodiment first performs the authentication process for the UE, thereby preventing a possible handoff delay due to an authentication failure.

If mutual authentication and key distribution processes between the UE 201 and the SGSN 208 are completed, the UE 201 delivers a Pre-Registration Request message for requesting pre-registration for the UMTS network 250 to the GGSN/FA 209, step 410. The Pre-Registration Request message includes a home address $IP_{UE}$ of the UE 201. Upon receiving the Pre-Registration Request message, the GGSN/FA 209 generates a PDP address $IP_{UMTS}$ to be used for Mobile IP handoff of the UE 201, and transmits the $IP_{UMTS}$ and the $IP_{UE}$ to the HA 215 using a Pre-Registration Update Request message for requesting update of the address management table, step 412. Because the second exemplary embodiment is performed through a separate pre-registration request by a UE after completion of the UMTS AKA process, the Pre-Registration Request message is directly delivered to the GGSN/FA 209 that will generate a new PDP address $IP_{UMTS}$ for the UE 201.

Upon receiving the Pre-Registration Update Request message, the HA 215 searches its address management table for a 'Next IP address' field for the $IP_{UE}$ and registers the $IP_{UMTS}$ in the searched 'Next IP address' field, accomplishing the pre-registration. As a result, a 'Current IP address' field and the 'Next IP address' field for the $IP_{UE}$ in the address management table are set to $IP_{WLAN}$ and $IP_{UMTS}$, respectively.

Thereafter, in step 414, the HA 215 buffers all packets targeted to the $IP_{WLAN}$ beginning at the time when the 'Next IP address' field in the address management table was updated. In step 416, the HA 215 transmits a Pre-Registration Update Response message to the GGSN/FA 209, indicating the completed update of the address management table and the start of buffering.

Upon receiving the Pre-Registration Update Response message, the GGSN/FA 209 transmits a Pre-Registration Response message to the UE 201 via the WLAN AN 210 to inform the UE 201 of the completion of the pre-registration process, step 418. The Pre-Registration Response message includes the $IP_{UMTS}$. The UE 201 performs detachment from the WLAN AN 210 through an AP 202, step 420, and then performs L2 handoff to the UMTS network 250, step 422.

Next, the UE 201 performs a UMTS attachment process in step 424. If encryption key values for the previously established radio connection between the SGSN 208 and the UTRAN 207 are delivered to the UTRAN 207, the AKA process may be completely omitted from the UMTS attachment process. However, when only the authentication vector generation/distribution and mutual authentication between the UE 201 and the SGSN 208 are performed without a previously established radio connection between the SGSN 208 and the UTRAN 207, the AKA process of delivering encryption keys from the SGSN 208 to the UTRAN 207 may be included in the UMTS attachment process.

In step 426, the UE 201 generates, that is, activates, a PDP context for data transmission. Because the UE 201 was previously allocated the PDP address $IP_{UMTS}$ through the pre-authentication and pre-registration processes, it uses the intact $IP_{UMTS}$ in the PDP context activation process.

In step 428, the UE 201 delivers a Pre-Registration Completion message including the $IP_{UE}$ or the $IP_{UMTS}$ to the HA 215. Upon receiving the Pre-Registration Completion message, the HA 215 searches its address management table for a 'Next IP address' field for the $IP_{UMTS}$ or the $IP_{UE}$, sets the $IP_{UMTS}$ previously registered in the searched 'Next IP address' field as an address value in the 'Current IP address' field, and performs 'Null' processing on the 'Next IP address' field, thereby completing a Mobile IP registration process. Next, the HA 215 stops the packet buffering that has been performed during handoff of the UE 201, and forwards the buffered packets to the UE 201 in step 430. In step 432, packets are exchanged between the UE 201, with the $IP_{UMTS}$, and the HA 215.

As can be understood from the foregoing description, exemplary embodiments of the present invention can perform pre-authentication and pre-registration processes during handoff between heterogeneous networks of WLAN and UMTS networks, thereby maximizing a reduction in the delay which may be caused by authentication and registration processes after a UE moves. In addition, the exemplary embodiments can buffer received packets targeted to a UE during a handoff period, and then forward the buffered packets to the UE after completion of the handoff, thereby contributing to a reduction in packet loss which may occur during handoff. Moreover, the exemplary embodiments of the present invention can enable fast, seamless handoff during interworking between a WLAN network and a UMTS network, thereby guaranteeing service continuity.

While the present invention has been shown and described with reference to certain preferred embodiments thereof, it will be understood by those of ordinary skill in the art that various changes in form and detail may be made therein without departing from the spirit and scope of the present invention as defined by the appended claims and equivalents thereof.

What is claimed is:

1. A method for performing handoff of user equipment (UE) connected to a wireless local area network (WLAN) to a mobile communication network in an interworking system between the WLAN and the mobile communication network including a gateway General Packet Radio Service (GPRS) support node (GGSN) and a serving GPRS support node (SGSN), the method comprising:

receiving, by the SGSN, a pre-registration request message including a home IP address and an international mobile station identifier (IMSI) of the UE from the UE via the WLAN when the UE determines handoff in response to a link layer trigger while it communicates with the WLAN using a first temporary Internet protocol (IP) address;

performing, between the UE and the SGSN, authentication vector generation, authentication for the UE, and encryption key distribution processes based on the IMSI;

generating, by the GGSN, a second temporary IP address to be used by the UE in the mobile communication network, and transmitting a first message for requesting registration of the second temporary IP address to a home agent (HA) of the UE;

receiving, by the GGSN, a second message indicating registration of the second temporary IP address from the HA of the UE, and transmitting a third message to the UE via the WLAN indicating completion of pre-authentication for the UE and registration of the second temporary IP address; and transmitting, by the UE, a fourth message indicating completion of pre-registration handoff for the UE to the HA of the UE when the handoff of the UE to the mobile communication network is completed.

2. The method of claim 1, further comprising buffering, by the HA of the UE, packets targeted to the UE having the first temporary IP address from a time when the HA of the UE registers the second temporary IP address until a time when the HA of the UE receives the fourth message.

3. The method of claim 2, further comprising delivering, by the HA of the UE, the buffered packets to the UE using the second temporary IP address upon receiving the fourth message.

4. The method of claim 1, wherein the first message comprises the home IP address of the UE and the second temporary IP address.

5. The method of claim 4, further comprising searching, by the HA of the UE, an address management table using the home IP address of the UE upon receiving the first message, and setting a next IP address field corresponding to the home IP address searched from the address management table as the second temporary IP address.

6. The method of claim 5, wherein upon receiving the fourth message, the HA searches the address management table using the home IP address of the UE, sets the second temporary IP address of the next IP address field searched from the address management table in a current IP address field corresponding to the home IP address of the address management table, and sets the next IP address field with a null value.

7. The method of claim 1, wherein upon receiving the third message, the UE activates a packet data protocol (PDP) context by generating a PDP context having the second temporary IP address between the UE and the GGSN.

8. The method of claim 1, further comprising receiving, by the GGSN, a PDP address request message for requesting generation of the second temporary IP address from the SGSN after performing the authentication vector generation, authentication for the UE, and encryption key distribution processes.

9. The method of claim 8, further comprising:
generating, by the GGSN, the second temporary IP address in response to the PDP address request message; and
transmitting, by the GGSN, a PDP address response message including the second temporary IP address to the SGSN.

10. The method of claim 1, further comprising:
delivering, by the SGSN, a fifth message indicating completion of the pre-authentication process to the UE via the WLAN, after performing the authentication vector generation, authentication for the UE, and encryption key distribution processes; and
transmitting, by the GGSN, a request for pre-registration to the UE after the fifth message is transmitted and receiving a sixth message for requesting generation of the second temporary IP address via the WLAN.

11. A method for performing handoff of user equipment (UE) connected to a wireless local area network (WLAN) to a mobile communication network by a gateway General Packet Radio Service (GPRS) support node (GGSN) in an interworking system between the WLAN and the mobile communication network including the GGSN and a serving GPRS support node (SGSN), the method comprising:

performing authentication for the UE and encryption key distribution processes between the UE and the SGSN based on an international mobile station identifier (IMSI) of the UE after the UE determines handoff in response to a link layer trigger while it communicates with the WLAN using a first temporary Internet protocol (IP) address, and authentication vector generation;

generating, by the UE, a second temporary IP address to be used in the mobile communication network;

transmitting a first message for requesting registration of the second temporary IP address to a home agent (HA) of the UE; and transmitting a third message indicating completion of pre-authentication for the UE and registration of the second temporary IP address to the UE via the WLAN upon receiving a second message indicating registration of the second temporary IP address from the HA of the UE so that the UE performs handoff to the mobile communication network.

12. The method of claim 11, further comprising buffering, by the HA of the UE, packets targeted to the UE having the first temporary IP address until the UE completes handoff to the mobile communication network, after registering the second temporary IP address.

13. The method of claim 12, wherein the HA of the UE delivers the buffered packets to the UE using the second temporary IP address when the handoff of the UE to the mobile communication network is completed.

14. The method of claim 11, wherein the first message comprises the home IP address of the UE and the second temporary IP address.

15. The method of claim 14, further comprising searching, by the HA of the UE, its address management table using the home IP address of the UE upon receiving the first message, and setting a next IP address field corresponding to the home IP address searched from the address management table as the second temporary IP address.

16. The method of claim 15, wherein the HA of the UE searches the address management table using the home IP address of the UE when the handoff of the UE to the mobile communication network is completed, sets the second temporary IP address of the next IP address field searched from the address management table in a current IP address field corresponding to the home IP address of the address management table, and sets the next IP address field with a null value.

17. The method of claim 11, further comprising receiving a packet data protocol (PDP) address request message for requesting generation of the second temporary IP address from the SGSN after performing the authentication vector generation, authentication for the UE, and encryption key distribution processes.

18. The method of claim 17, further comprising:
generating the second temporary IP address in response to the PDP address request message;, and
transmitting a PDP address response message including the second temporary IP address to the SGSN.

19. The method of claim 11, further comprising receiving a message for requesting pre-registration and generation of the second temporary IP address from the UE via the WLAN after the authentication vector generation, authentication for the UE, and encryption key distribution processes are performed.

20. A mobile communication system comprising:
user equipment (UE) connected to a wireless local area network (WLAN) through interworking between a mobile communication network and the WLAN;

a serving General Packet Radio Service (GPRS) support node (SGSN) for receiving a pre-registration request message including a home IP address and an international mobile station identifier (IMSI) of the UE from the UE via the WLAN when the UE determines handoff in response to a link layer trigger while it communicates with the WLAN using a first temporary Internet protocol (IP) address, and performing authentication vector generation, authentication for the UE, and encryption key distribution processes with the UE based on the IMSI;

a gateway GPRS support node (GGSN) for generating a second temporary IP address to be used by the UE in the mobile communication network, transmitting a first message for requesting registration of the second temporary IP address, receiving a second message indicating registration of the second temporary IP address, and transmitting a third message indicating completion of pre-authentication for the UE and registration of the second temporary IP address to the UE via the WLAN; and a home agent (HA) for registering the second temporary IP address upon receiving the first message from the GGSN, and transmitting the second message to the GGSN in response to the first message;

wherein the UE performs handoff to the mobile communication network upon receiving the third message, and transmits a fourth message indicating completion of pre-registration handoff for the UE to the HA.

21. The mobile communication system of claim 20, wherein the HA buffers packets targeted to the UE having the first temporary IP address from a time when the HA registers the second temporary IP address until a subsequent time when the HA receives the fourth message.

22. The mobile communication system of claim 21, wherein upon receiving the fourth message, the HA delivers the buffered packets to the UE using the second temporary IP address.

23. The mobile communication system of claim 21, wherein the first message comprises the home IP address of the UE and the second temporary IP address.

24. The mobile communication system of claim 23, wherein the HA searches an address management table using the home IP address of the UE, and sets a next IP address field corresponding to the home IP address searched from the address management table as the second temporary IP address.

25. The mobile communication system of claim 24, wherein the HA searches the address management table using the home IP address of the UE upon receiving the fourth message, sets the second temporary IP address of the next IP address field searched from the address management table in a current IP address field corresponding to the home IP address of the address management table, and sets the next IP address field with a null value.

26. The mobile communication system of claim 20, wherein the GGSN receives a packet data protocol (PDP) address request message for requesting generation of the second temporary IP address from the SGSN after performing the authentication vector generation, authentication for the UE, and encryption key distribution processes.

27. The mobile communication system of claim 26, wherein the GGSN generates the second temporary IP address in response to the PDP address request message, then transmits a PDP address response message including the second temporary IP address to the SGSN.

28. The mobile communication system of claim 20, wherein the GGSN receives a message for requesting pre-registration and generation of the second temporary IP address from the UE via the WLAN after the authentication vector generation, authentication for the UE, and encryption key distribution processes are performed.

* * * * *